(12) United States Patent
Womack et al.

(10) Patent No.: US 6,438,114 B1
(45) Date of Patent: Aug. 20, 2002

(54) METHOD AND APPARATUS FOR ENABLING MULTIMEDIA CALLS USING SESSION INITIATION PROTOCOL

(75) Inventors: James E. Womack, Bedford, TX (US); Mark Pecen, Palatine, IL (US); Andrew Howell, Barnwood (GB)

(73) Assignee: Motorola, Inc., Schaumburg, IL (US)

( * ) Notice: Subject to any disclaimer, the term of this patent is extended or adjusted under 35 U.S.C. 154(b) by 40 days.

(21) Appl. No.: 09/777,189

(22) Filed: Feb. 5, 2001

(51) Int. Cl.[7] .............................. H04J 3/12; H04J 3/24; H04Q 7/20
(52) U.S. Cl. ...................... 370/329; 370/338; 370/349; 370/410; 455/517
(58) Field of Search ................................. 370/270, 280, 370/328, 329, 338, 349, 389, 401, 410, 431, 438, 522; 455/442, 445, 450, 507, 509, 515, 517; 709/227, 230, 238

(56) References Cited

U.S. PATENT DOCUMENTS

| | | | |
|---|---|---|---|
| 5,901,142 A | * | 5/1999 | Averbuch et al. ............ 370/329 |
| 6,026,086 A | * | 2/2000 | Lancelot et al. ............ 370/353 |
| 6,094,429 A | * | 7/2000 | Blanchette et al. ......... 370/347 |
| 6,282,193 B1 | * | 8/2001 | Hluchyj et al. ............. 370/356 |

OTHER PUBLICATIONS

"Direct APPN Sessions Using Dynamic Address Resolution On Lans", IBM Technical Disclosure Bulletin, Jan. 1, 1991, vol. 33, No. 8, pp. 32–35.*
"NetBIOS Local Area Network Access Agents", IBM Technical Disclosure Bulletin, Dec. 1, 1993, vol. 36, No. 12, pp. 417–422.*
"SIP: Session Initiation Protocol", (Internet Engineering Task Force (IETF); M. Handley, H. Schurzrine, E. Schooler, J. Rosenberg), Mar., 1999.

"A comparison between GERAN packet–switched call setup using SIP and GSM circuit–switched call setup using RIL3–CC, RIL3–MM, RIL3–RR and DTAP", (Tdoc GP00036; TSG GERAN; Nortel), Aug. 28th, 2000.
GSM 04.60, "Digital cellular telecommunications system (Phase 2+); General Packet Radio Service (GPRS); Mobile Station (MS)—Base Station System (BSS) interface; Radio Link Control/Medium Access Control (RLC/MAC) protocol", (European Telecommunications Standards Institute (ETSI), Global System for Mobile Communications (GSM) specifications).
GSM 04.18, "Digital cellular telecommunications system (Phase 2+); Mobile radio interface layer 3 specification, Radio Resource Control Protocol", (European Telecommunications Standards Institute (ETSI), Global System for Mobile Communications (GSM) specifications).
3GPP 24.007, "3rd Generation Partnership Project (3GPP); Technical Specification Group Core Network (TSG CN); Mobile radio interface radio network signally layer 3; General aspects", (3rd Generation Partnership Project; Telecommunications Standard).

* cited by examiner

Primary Examiner—Alpus H. Hsu
(74) Attorney, Agent, or Firm—Michael C. Soldner

(57) ABSTRACT

A communication system for exchanging session initiation protocol signaling messages between a user host associated with a wireless communication device, and a remote user host, through a network, and method therefor. A multiplexer module positioned within the wireless communication device multiplexes call control data, session initiation protocol commands, and packet data setup and status transmitted between the wireless communication device and the network. A control module located in the multiplexer determines whether a packet associated control channel has been set up, and, in response to the packet associated control channel not being set up, the multiplexer module utilizes a slow dedicated control channel for transmitting signaling associated with requesting a packet associated control channel for transmitting the session initiation protocol commands.

23 Claims, 6 Drawing Sheets

METHOD AND APPARATUS FOR ENABLING MULTIMEDIA CALLS USING SESSION INITIATION PROTOCOL

FIELD OF THE INVENTION

The present invention relates generally to a communication system, and in particular, the present invention relates to a method and apparatus for exchanging session initiation protocol signaling messages between a mobile station and a network for setup of multimedia calls.

BACKGROUND OF THE INVENTION

Setup procedures associated with multimedia calls placed by mobile terminals are performed using a recently developed signaling protocol commonly known as the session initiation protocol (SIP). In particular, the session initiation protocol is an open internet protocol (IP) standard designed specifically for initiating, managing, and terminating interactive IP sessions, such as, but not limited to Voice over IP sessions and multimedia conferences.

A current method for utilizing the session initiation protocol involves a Global System for Mobile Communications (GSM) approach, which utilizes the slow dedicated control channel (SDCCH) for channel signaling for setting up and maintaining a call. However, the amount of data transmitted by the slow dedicated control channel is a relatively small amount, i.e., 23 bytes, and may occur approximately every 120 milliseconds, while session initiation protocol messages average approximately 400 bytes of information per message. As a result, the amount of time necessary to transport a multimedia message between a mobile station and a mobile terminal using the slow dedicated control channel is excessively long, since many slow dedicated control channels would be required to pass the session initiation protocol message to and from the mobile station. In addition, additional setup time would also be required in order to set up a signaling link if one is not already available.

Another method currently proposed for utilizing the session initiation protocol involves using packet data channels to set up and maintain a virtual multimedia connection. FIG. 1 is a data flow diagram of a session initiation protocol call setup sequence utilizing packet data channels. As illustrated in FIG. 1, prior to sending messages between a mobile station 100 and a network 102, a temporary block flow (TBF) 104 must be set up. When utilizing packet data channels to set up and maintain the virtual media connection, once temporary block flow 104 is set up between mobile station 100 and network 102, mobile station 100 transmits an INVITE command 106 to network 102 along a packet associated control channel (PACCH). Once network 102 receives INVITE command 106, a temporary block flow 108 is again set up between mobile station 100 and network 102, so that upon completion of the set up of temporary block flow 108, network 102 responds to INVITE command 106 by sending a RINGING status command 110 to mobile station 100 along the packet associated control channel.

Once RINGING status command 110 is sent, a temporary block flow 112 is once again set up between mobile station 100 and network 102 to enable transmission of an OK acknowledgement message 114 from network 102 to mobile station 100. Finally, a temporary block flow 116 is once again set up between mobile station 100 and network 102 to enable an acknowledge (ACK) message 118 to be sent from mobile station 100 to network 102.

FIG. 2 is a data flow diagram of an uplink temporary block flow set up sequence between a mobile station and a network. As illustrated in FIG. 2., during the set up of each of temporary block flows 104, 108, 112 and 116, mobile station 100 sends a channel request access burst 120 to network 102 using a random access channel (RACH). Network 102 responds by sending an immediate assignment message 122 along an access grant channel (AGCH) to mobile station 100. Mobile station 100 then sends a packet resource request message 124 along the packet associated control channel to network 102 requesting resources for the temporary block flow. Network 102 responds with a packet uplink assignment message 126, which is acknowledged by mobile station 100 in a packet control acknowledge message 128. Note that while the temporary block flow set up sequence shown in FIG. 2 is in the uplink direction, i.e., from mobile station 100 to network 202, a downlink temporary block flow set up sequence is similar, with the major exception being that network 102 initially pages mobile station 100.

Since a temporary block flow set up sequence can typically take approximately 1.7 seconds or more to complete, a relatively large amount of time is needed for set up of temporary block flows 104, 108, 112 and 116, so that the use of packet data channels to set up and maintain a virtual multimedia connection, as shown in FIG. 1, tends to require excessive set up times for multimedia calls as well.

As a result of the excessive call set up times required by current methods for utilizing session initiation protocols, excessive delays tend to occur when calls are maintained by the exchange of control information. Likewise, current methods also tend to result in control channel congestion since they require excessive utilization of radio resources due to the fact that session initiation protocol control messages are designed for wireline use, and each time a control message is sent in order to set up, tear down, or maintain a multimedia session, a large exchange of signaling information will necessarily have to occur just to enable the flow of such information.

Accordingly, what is needed is a more efficient method and apparatus for the interchange of session initiation protocol signaling messages between a mobile station and a network for setup of multimedia calls by the mobile station.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify like elements, and wherein:

DETAILED DESCRIPTION OF THE PREFERRED EMBODIMENT

The present invention is a method and apparatus for utilizing a slow dedicated control channel, which provides periodic and synchronized communication capability between a mobile station and a network, to request a packet associated control channel for the transmission of session initiation protocol messages. As a result, the present invention eliminates much of the set up time required for utilizing the session initiation protocol when a packet associated control channel is used for packet channel set up.

Figure 1:
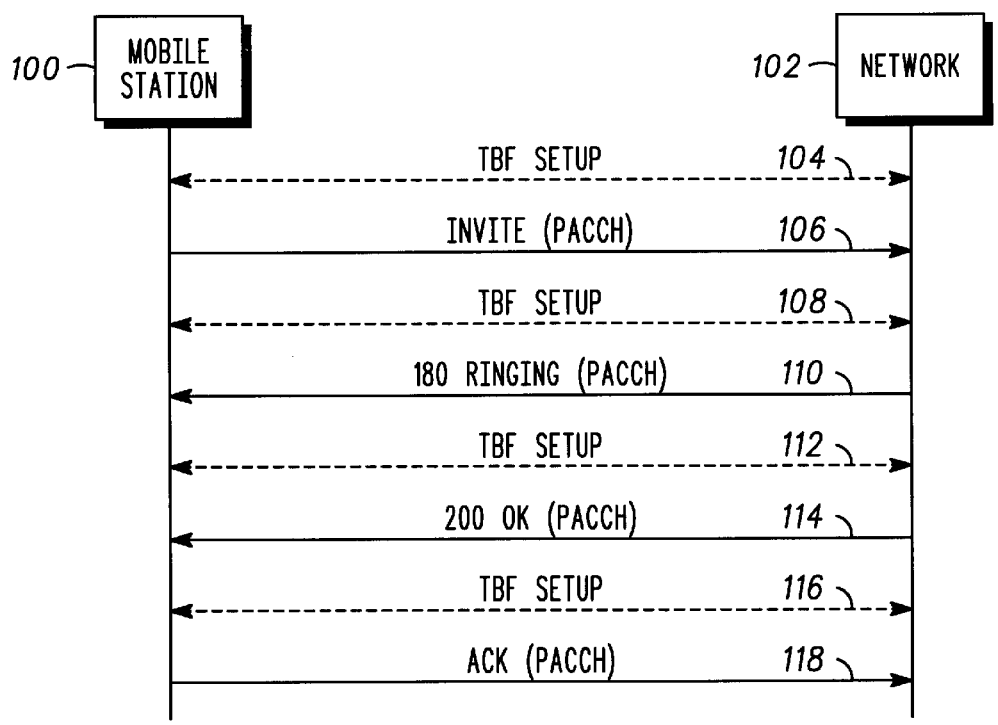
FIG. 1 is a data flow diagram of a session initiation protocol call set up sequence utilizing packet data channels.
Figure 2:
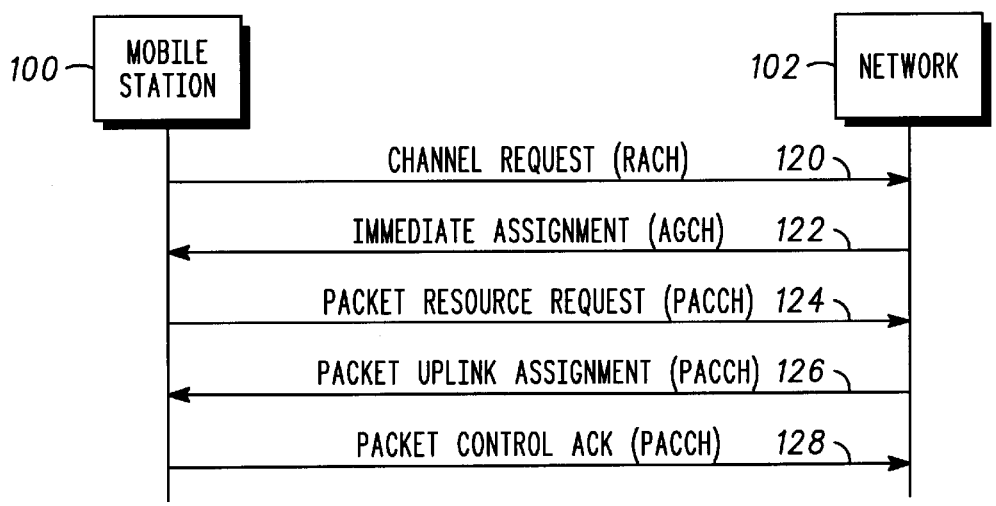
FIG. 2 is a data flow diagram of an uplink temporary block flow set up sequence between a mobile station and a network.
Figure 3:
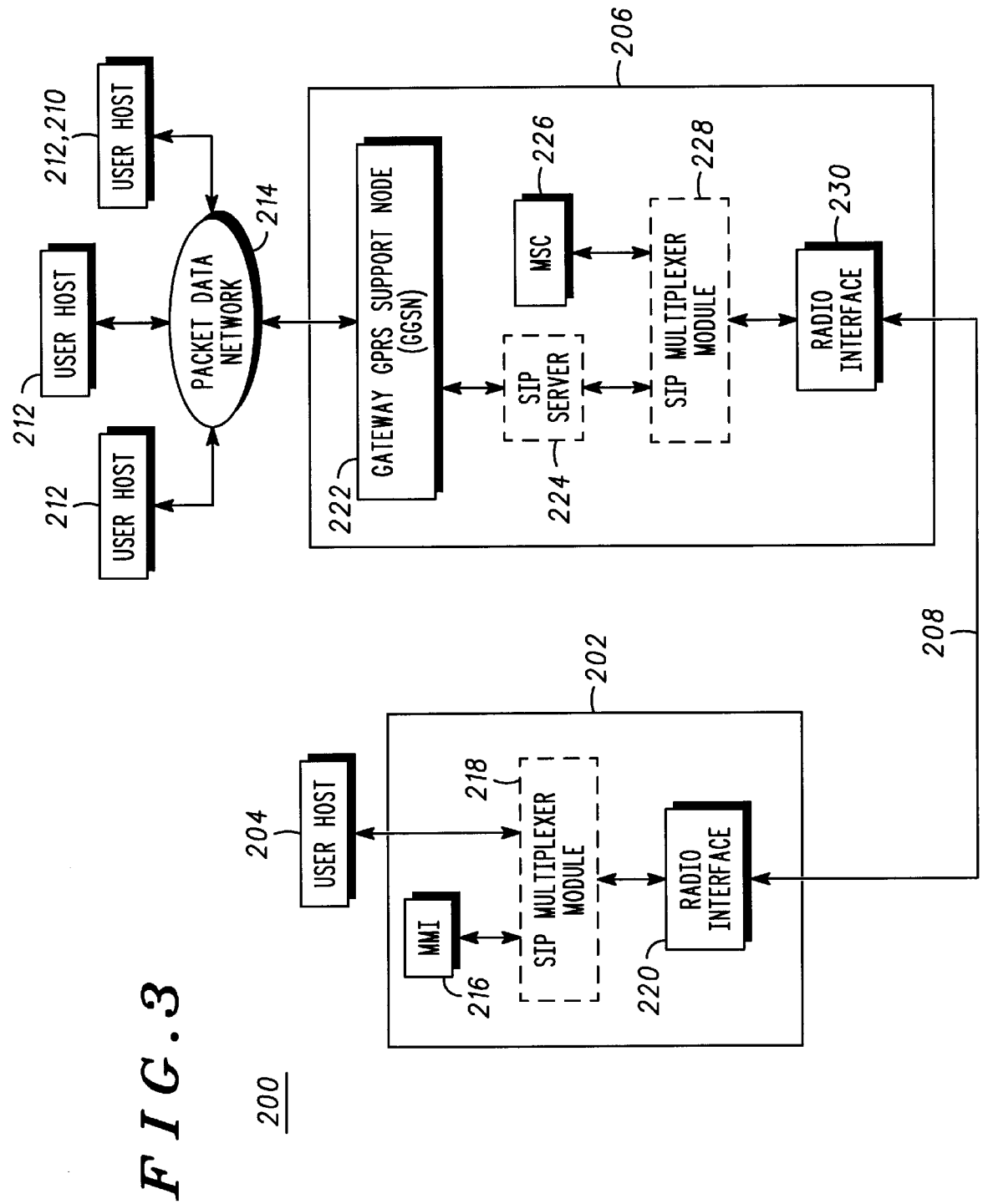
FIG. 3 is a schematic diagram of a communication system for exchanging session initiation protocol signaling messages according to the present invention.

FIG. 3 is a schematic diagram of a communication system for exchanging session initiation protocol signaling messages according to the present invention. As illustrated in FIG. 3, a communication system 200 according to the present invention includes a wireless handheld communication device, or mobile station 202, and a user host 204 linked to mobile station 202, for example, through a physical wired connection, an infrared link, or a wireless local link. User host 204 includes, for example, a personal computer, a personal organizer, or other device having user computer applications.

Although user host 204 is shown in FIG. 3 as being separate from and linked to mobile station 202, it is understood that, according to the present invention, user host 204 could also be located within mobile station 202 as a portion thereof.

Mobile station 202 is linked to a network 206 through an air interface 208, enabling mobile station 202 and user host 204 to be utilized by a user to perform a multimedia call with a remote user host 210, or with one or more of a plurality of remote user hosts 212, linked to network 206 through a packet data network 214.

As will be described in detail below, mobile station 202 includes a man-machine interface (MMI) 216, a session initiation protocol multiplexer (SIP MUX) module 218, and a radio interface 220, while network 206 includes a gateway general packet radio service (GPRS) support node (GGSN) 222, a session initiation protocol server, or SIP server 224, a mobile switching center (MSC) 226, a session initiation protocol multiplexer (SIP MUX) module 228, and a radio interface 230.

Figure 4:
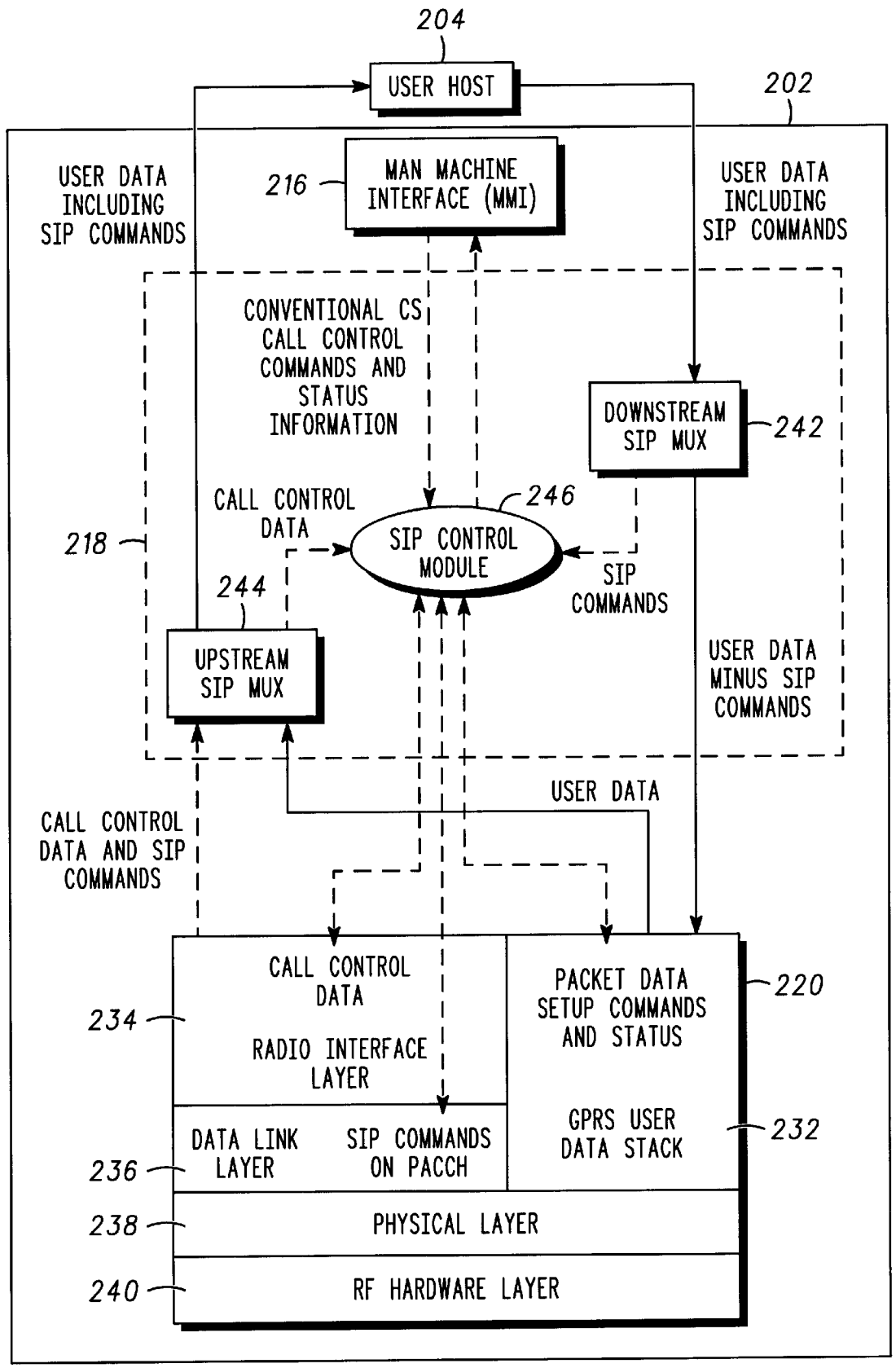
FIG. 4 is a schematic diagram of a mobile station for exchanging session initiation protocol signaling messages according to the present invention.

FIG. 4 is a schematic diagram of a mobile station for exchanging session initiation protocol signaling messages according to the present invention. As illustrated in FIG. 4, radio interface 220 of mobile station 202 includes a General Packet Radio Service (GPRS) user data stack 232, along with several functional layers arranged in hierarchical form, such as a radio interface layer 234, a data link layer 236, and a physical layer 238, all located hierarchically above a radio frequency (RF) hardware layer 240. Radio interface layer 234 is the application layer and is composed of several components, or sublayers (not shown), including a call control (CC) sublayer, a mobility management (MM) sublayer, and a radio resource management (RR) sublayer. Call control sublayer controls end-to-end call establishment, both mobile originating and terminating, and, in general, all functions related to call management, while mobility management sublayer defines the dialogue between mobile station 202 and a network, managing location of mobile station 202, along with security functions necessary for mobile application, such as authentication and ciphering key management, for example. Radio resource management sublayer provides control functions for the operation of common and dedicated channels, and establishes and releases radio connections between mobile station 202 and various base station controllers (not shown) for the duration of a call. The radio resource management sublayer, together with data link layer 236 and physical layer 238, provide the means for point-to-point connections on which mobility management and call control messages are carried.

Data link layer 236 provides a reliable dedicated signaling link connection between mobile station 202 and a base station (not shown), while physical layer 238 provides interface between radio frequency (RF) hardware for transmitting and receiving signals and a call processor (not shown), including scheduling of reception and transmission of physical data, receiver gain control, transmitter power control, signal level measurements, and so forth.

SIP MUX module 218 includes a downstream session initiation protocol multiplexer (SIP MUX) 242, an upstream session initiation protocol multiplexer (SIP MUX) 244, and a session initiation protocol (SIP) control module 246. Downstream SIP MUX 242 multiplexes user data, including session initiation protocol commands, received from user host 204, so that the session initiation protocol commands are passed from downstream SIP MUX 242 to SIP control module 246, while the user data is passed from downstream SIP MUX 242 to GPRS user data stack 232 of radio interface 220. Upstream SIP MUX 244 multiplexes user data received from GPRS user data stack 232, along with call control data and session initiation protocol commands received from radio interface layer 234, so that the call control data is passed to SIP control module 246 and the user data, including session initiation protocol commands, is passed to user host 204.

Finally, SIP control module 246 exchanges conventional circuit-switched call control commands and status information with man-machine interface 214, and acts as a transparent signaling gateway for session initiation protocol commands and responses, as will be described below, exchanging call control data with radio interface layer 234, session initiation protocol commands with data link layer 236, and packet data set up commands and status with GPRS user data stack 232 of radio interface 220.

Figure 5:
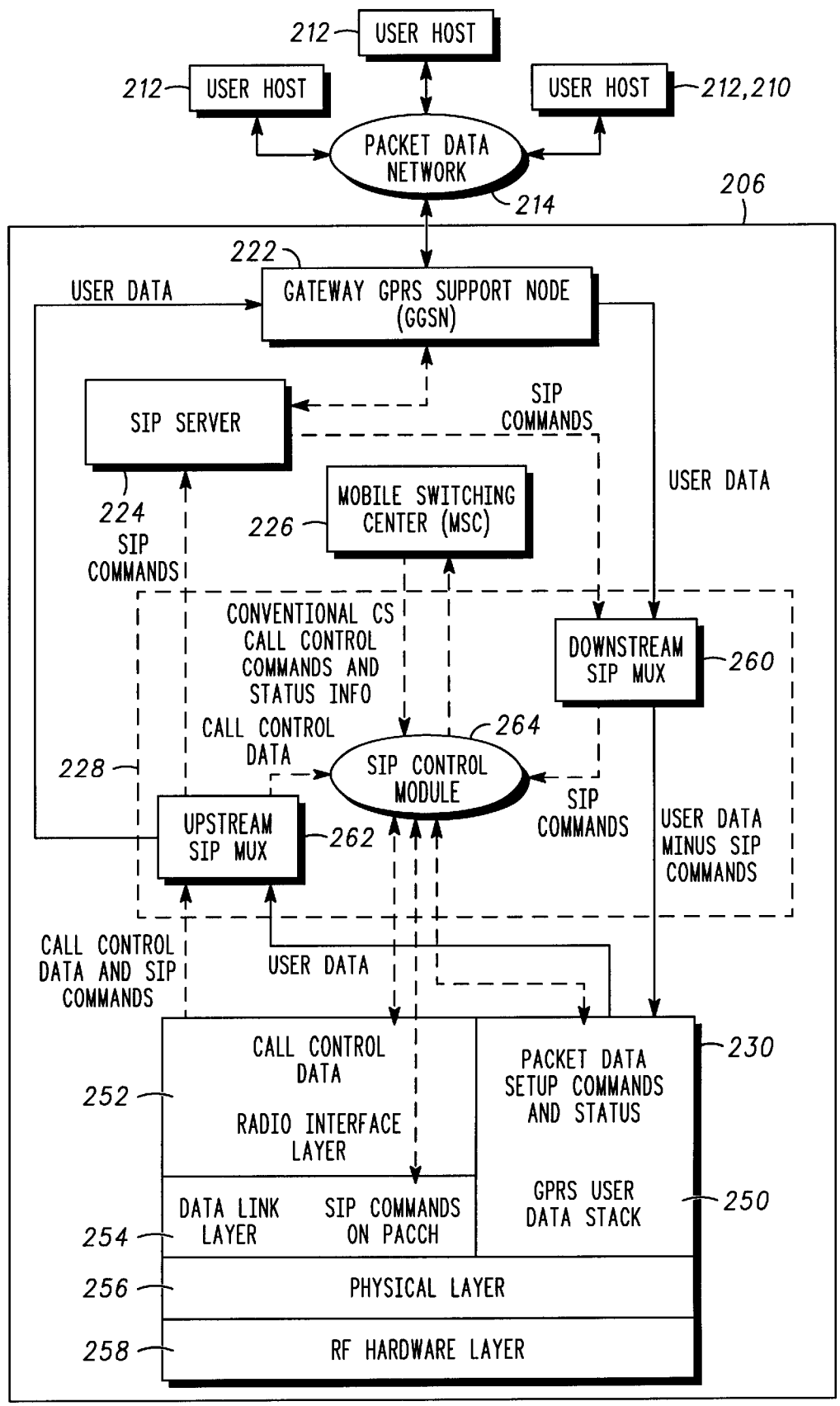
FIG. 5 is a schematic diagram of a network exchanging session initiation protocol signaling messages according to the present invention.

FIG. 5 is a schematic diagram of a network exchanging session initiation protocol signaling messages according to the present invention. As illustrated in FIG. 5, radio interface 230 of network 206 is similar to radio interface 220 of mobile station 202, and includes a GPRS user data stack 250, a radio interface layer 252, a data link layer 254, and a physical layer 256, all located hierarchically above a radio frequency (RF) hardware layer 258.

Although connected to mobile switching center 226 rather than man-machine interface 216, SIP MUX module 228 mirrors SIP MUX module 218 of mobile station 202, and therefore, as illustrated in FIG. 5, includes a downstream session initiation protocol multiplexer (SIP MUX) 260, an upstream session initiation protocol multiplexer (SIP MUX) 262, and a session initiation protocol (SIP) control module 264. Downstream SIP MUX 260 multiplexes user data, along with session initiation protocol commands, received from user host 210 or user hosts 212, through GGSN 222, so that downstream SIP MUX 260 passes the session initiation protocol commands to SIP control module 264 and passes the user data to GPRS user data stack 250 of radio interface 230.

Upstream SIP MUX 262 multiplexes user data received from GPRS user data stack 250, along with call control data and session initiation protocol commands received from radio interface layer 252, so that call control data is passed to SIP control module 264, user data is passed to user host 210 or one or more of user hosts 212 through GGSN 222 and packet data network 214, and session initiation protocol commands are passed to SIP server 224. The session initiation protocol commands are then passed by SIP server 224 to user host 210 or one or more of user hosts 212 through GGSN 222 and packet data network 214.

SIP control module 264 exchanges conventional circuit-switched call control commands and status information with mobile switching center 226, and similar to SIP control module 246 of mobile station 202, acts as a transparent signaling gateway for session initiation protocol commands and responses, as will be described below, exchanging call control data with radio interface layer 252, session initiation protocol commands with data link layer 254, and packet data set up commands and status information with GPRS user data stack 250 of radio interface 230.

As illustrated in FIG. 4, according to the present invention, entry of appropriate commands for effectuating a session initiation protocol call by a user at user host 204, results in a SIP INVITE command being sent by user host 204 and received at downstream SIP MUX 242 of mobile station 202. Downstream SIP MUX 242 is content-aware at the session initiation protocol level, and intercepts and transfers the SIP INVITE command to SIP control module 246. According to the present invention, upon receipt of SIP INVITE command, SIP control module 246 first determines whether the packet associated control channel (PACCH) has already been set up, as in the case of a packet data transfer already in progress, or an "open-ended" data transfer in progress, which results in resources remaining on "hot-standby" for a period of time. If SIP control module 246 determines that the packet associated control channel is set up, the SIP INVITE command is merely sent on the packet associated control channel. However, upon determining that the packet associated control channel has not been set up already, SIP control module 246 informs GPRS user data stack 232 of the desire to set up the packet associated control channel for packet operation.

Figure 6:
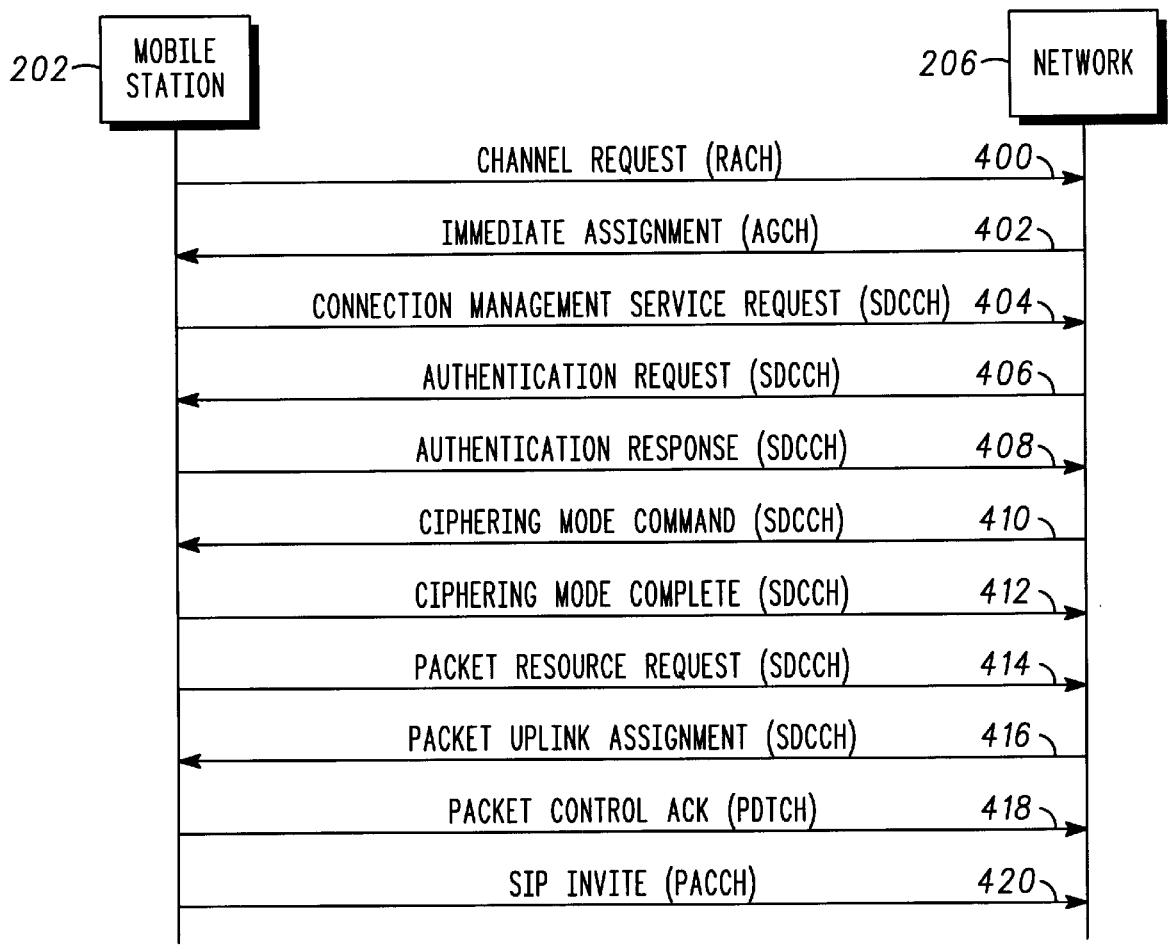
FIGS. 6–9 are signal flow diagrams for set up of a session initiation protocol call by a mobile station in a communication system, according to the present invention.

FIGS. 6–9 are signal flow diagrams for set up of a session initiation protocol call by a mobile station in a communication system, according to the present invention. As illustrated in FIGS. 4–6, once informed by GPRS user data stack 232 of the desire to set up the packet associated control channel, data link layer 236 sends a channel request 400 to network 206 by sending a special "short burst" on the random access channel (RACH) through physical layer 256 to RF hardware layer 240. Channel request 400 is transmitted along air interface 208 from RF hardware layer 240 to RF hardware layer 258 of network 206, which then passes channel request 400 to GPRS user data stack 250 through data link layer 254 and physical layer 256. Data link layer 254 responds to receipt of channel request 400 at GPRS user data stack 250 by sending an immediate assignment message 402 to RF hardware layer 258, through physical layer 256, for transmission of immediate assignment message 402 to mobile station 202 along the access grant channel (AGCH).

Immediate assignment message 402, which sets up a slow dedicated control channel (SDCCH) over which signaling messages may flow, commonly referred to as dedicated mode, is received along air interface 208 by RF hardware layer 240 of mobile station 202. Once immediate assignment message 402 is received at GPRS user data stack 232 from RF hardware layer 240 through physical layer 238 and data link layer 236, a connection management service request 404 is passed through physical layer 238 from data link layer 236 to RF hardware layer 240 for transmission of connection management service message 404 from mobile station 202 to network 206 along the slow dedicated control channel. Once connection management service request 404, which informs network 306 of the call set up control to be used and which is necessary in order to authenticate the user and to set ciphering modes, is received at GPRS user data stack 250 of network 206 from RF hardware layer 258, an authentication request 406 is passed through physical layer 256 from data link layer 254 to RF hardware layer 258 for transmission of authentication request 406 from network 206 to mobile station 202 along the slow dedicated control channel.

Once authentication request 406 is received at GPRS user data stack 232 of mobile station 202 from RF hardware layer 240, an authentication response 408 is passed through physical layer 238 from data link layer 2236 to RF hardware layer 240, for transmission of authentication request 406 from mobile station 202 to network 206 along the slow dedicated control channel. Authentication response 408 is received at RF hardware layer 258 of network 206 and passed along to GPRS user data stack 250 through data link layer 254 and physical layer 258. This authentication interchange signaling exchange 406 and 408 satisfies network 206 that mobile station 202 is whom it claims to be by sending authentication request 406 and receiving a special signed-response (SRES) that is processed by security algorithm A8 and returned by mobile station 202 in authentication response 408.

Once authentication response 408 is received by network 206, and network 206 is assured that mobile station 202 is legitimate, a ciphering mode command 410 is passed through physical layer 256 from data link layer 254 of network 206 to RF hardware layer 258, for transmission of ciphering mode command 410 from network 206 to mobile station 202 along the slow dedicated control channel. Ciphering command 410 is received at RF hardware layer 240 of mobile station 202 and passed along to GPRS user data stack 232 through data link layer 236 and physical layer 238.

Data link layer 236 then passes a ciphering mode complete response 412 to RF hardware layer 240 through physical layer 238 for transmission of ciphering mode complete response 412 from mobile station 202 to network 206 along the slow dedicated control channel. Ciphering mode command 410 instructs mobile station 202 to utilize a specific ciphering mode of several specified ciphering modes, and ciphering mode complete response 412 informs network 206 that mobile station 202 has set the specified ciphering mode.

According to the present invention, after sending ciphering mode complete response 412, a packet resource request 414 requesting radio resources for a packet data channel, including the packet associated control channel, is passed from data link layer 236 of mobile station 202 through physical layer 238 to RF hardware layer 240, for transmission of packet resource request 414 from mobile station 202 to network 206 along the slow dedicated control channel. Packet resource request 414 is received at RF hardware layer 258 of network 206 and passed to GPRS user data stack 250 through physical layer 256 and data link layer 254. A packet resource assignment message 416, informing mobile station 202 of its assigned resources in the uplink direction, is then passed from data link layer 254 to RF hardware layer 258 through physical layer 256 for transmission of packet resource assignment message 416 from network 206 to mobile station 202 along the slow dedicated control channel. Mobile station 202 may not send information over the packet domain until mobile station 202 receives packet resource assignment message 416, after which mobile station 202 may send information on a temporary block flow (TBF), which uses a packet data traffic channel (PDTCH), or on a packet associated control channel. These resources then remain available for a period defined by timers (not shown) and uplink signaling by mobile station 202 to tear down the packet transfer upon completion of the packet data.

Packet resource assignment message 416 is received at RF hardware layer 240 of mobile station 202 and passed along to GPRS user data stack 232 through data link layer 236 and physical layer 238. In order to inform network 206 once mobile station 202 has actually received and understands the resource assignment from packet resource assignment message 416, a packet control acknowledge message 418 is then passed from data link layer 236 to RF hardware layer 240 through physical layer 238 for transmission of packet control acknowledge message from mobile station 202 to network 206 along the packet data transmit channel.

In this way, by transmitting packet resource request 414 and packet uplink assignment 416 along the slow dedicated control channel, the present invention utilizes the slow dedicated control channel, rather than the packet associated control channel, to request and set up a packet associated control channel for transmission of the SIP INVITE message, thereby reducing the amount of time required for acquiring control channels when packet resource request 414, packet resource assignment message 416 and packet control acknowledge message 418 are sent using the packet associated control channel according to known temporary block flow set up procedures.

After packet control acknowledge message 418 is sent by mobile station 202, SIP control module 246 of mobile station 202 passes the SIP INVITE command 420 that originated from user host 204 and was received by downstream SIP MUX 242, to data link layer 212. SIP INVITE command 420 is then passed from data link layer 212 to RF hardware layer 240, for transmission of SIP INVITE command 420 from mobile station 202 to network 206 over the packet associated control channel.

SIP INVITE command 420 is received at RF hardware layer 258 of network 206, and passed to radio interface layer 252 through physical layer 256 and data link layer 254. Upstream SIP MUX 262 removes SIP INVITE command 420 from the call control data and session initiation protocol command stream received from radio interface layer 252, and passes SIP INVITE command 420 to SIP server 224. It is understood that, although SIP server 224 is shown in FIG. 5 as being located within network 206, according to the present invention, SIP server 224 may also located outside network 206. However, when SIP server 224 is located outside network 206, SIP commands would merely be transmitted by upstream SIP MUX 262 to SIP server 224, and received from SIP server 224 by downstream SIP MUX 260, through GGSN 222 and packet data network 214, rather than being received directly from upstream SIP MUX 262 and sent directly to downstream SIP MUX 260, as illustrated in FIG. 5. As a result, since the present invention is intended to be utilized in the same way, regardless of whether SIP server 224 is located within network 206 or outside of network 206, illustration and description of the present invention in which SIP server 224 is located outside network 206 has been omitted merely for the sake of brevity.

Upon receipt of SIP INVITE command 420, SIP server 224 subsequently sends a SIP RINGING command, to be transmitted to mobile station 202 in order to alert mobile station 202 of the effectuation of the session initiation protocol call, to downstream SIP MUX 260. Downstream SIP MUX 260 passes the SIP RINGING command to SIP control module 264, which informs GPRS user data stack 250 of its intent to set up the packet associated control channel in order to send the SIP RINING command.

Figure 7:
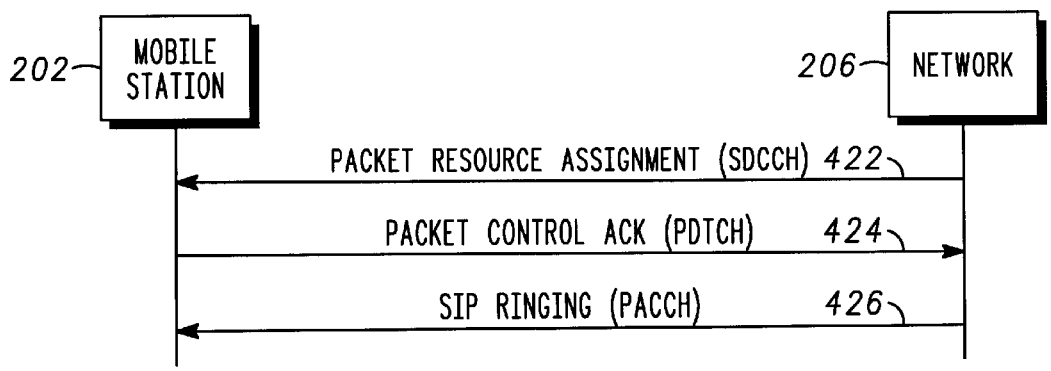

As illustrated in FIG. 7, in order to enable network 206 to send the SIP RINGING command to mobile station 202, a packet resource assignment message 422, which informs mobile station 200 of its assigned resources in the downlink direction, is passed by data link layer 254 of network 206 to RF hardware layer 258 through physical layer 256, for transmission of packet resource assignment message 422 along the slow dedicated control channel from network 206 to mobile station 202. Network 206 must then wait for an acknowledgement of packet resource assignment message 422 from mobile station 202 before downlink information may be sent on the packet data transmit channel or in a temporary block flow.

Packet resource assignment message 422 is received at RF hardware layer 240 of mobile station 202 and passed to GPRS user data stack 232 through physical layer 238 and data link layer 236. A packet control acknowledgement command 424, informing network 206 that mobile station 202 has received and understands the resource assignment and that therefore network 206 may now send a message to mobile station 206, is subsequently passed by data link layer 236 to RF hardware layer 240 through physical layer 238, for transmission of packet control acknowledgement command 424 from mobile station 202 to network 206 along the packet associated control channel.

Packet control acknowledgement command 424 is received at RF hardware layer 258 of network 206 and passed to GPRS user data stack 250 through physical layer 256 and data link layer 254. Once informed by GPRS user data stack 250 of acknowledgement of packet resource assignment message 422 from mobile station 202, i.e., receipt of packet control acknowledgement command 424, SIP control module 264 passes a SIP RINGING command 426 to data link layer 254, which then passes SIP RINGING command 426 to RF hardware layer 258 through physical layer 256, for transmission of SIP RINGING command 426 from network 206 to mobile station 202 along the packet associated control channel.

In this way, by transmitting packet resource assignment message 422 along the slow dedicated control channel, the present invention utilizes the slow dedicated control channel to set up a packet associated control channel for transmission of SIP RINGING command 426, thereby reducing the amount of time required for acquiring control channels when packet resource assignment message 422 and packet control acknowledgement message 424 are sent using the packet associated control channel according to known temporary block flow set up procedures.

Upon receipt at RF hardware layer 240 of mobile station 202, SIP RINGING command 426 is passed to data link layer 236 through physical layer 238, and from data link layer 236 to radio interface layer 234. The packet associated control channel message containing SIP RINGING command 426 is intercepted in mobile station 202 by upstream SIP MUX 244, which combines SIP RINGING command 426 with the user data stream from GPRS user data stack 232, sending the resulting combined user data and session initiation command to the session initiation protocol application in user host 224.

Figure 8:
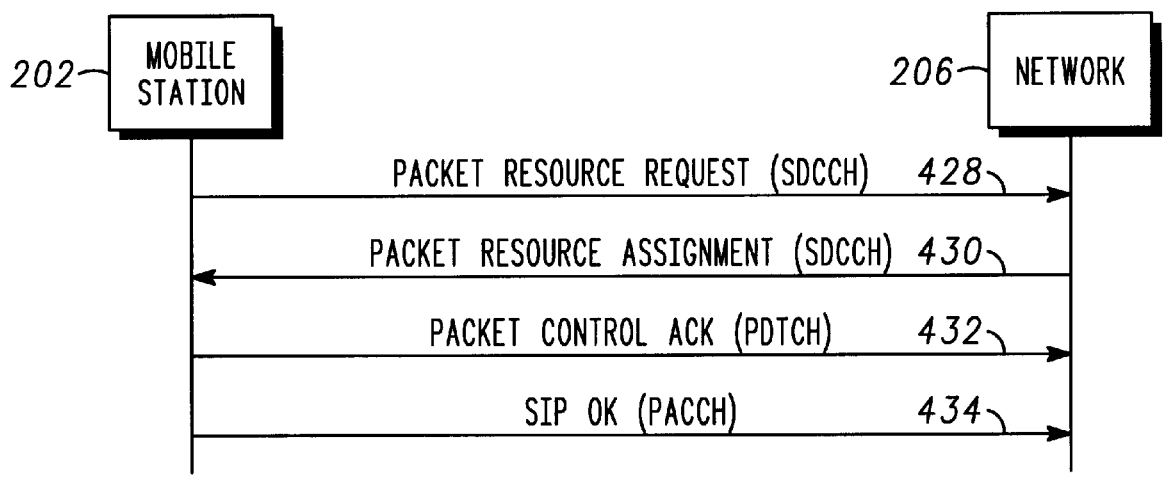

In order for mobile station 202 to acknowledge receipt of SIP RINGING command 426, a SIP OK acknowledgement message is transmitted by mobile station 202 to network 206 along the packet associated control channel. According to the present invention, in order to send the SIP OK acknowledgement message, SIP control module 246 first determines whether the packet associated control channel has already been set up, as in the case of a packet data transfer already in progress, or an "open-ended" data transfer in progress, which results in resources remaining on "hot-standby" for a period of time. If SIP control module 246 determines that the packet associated control channel is set up, the SIP OK acknowledgement message is merely sent on the packet associated control channel. However, as illustrated in FIG. 8, if SIP control module 246 determines that the packet associated control channel is not already set up, in order to set up transmission of a SIP OK acknowledgement message 434, SIP control module 246 informs GPRS user data stack 232 of the intent to request the associated radio resources. A packet resource request 428, requesting radio resources for a packet data channel, including the packet associated control channel, is subsequently passed by data link layer 236 through physical layer 238 to RF hardware layer 240 for transmission of packet resource request 428 from mobile station 202 to network 206 along the slow dedicated control channel. Upon receipt at RF hardware layer 258 of network 206, packet resource request 428 is passed to GPRS user data stack 250 through physical layer 256 and data link layer 254.

In response to packet resource request 428, a packet resource assignment message 430, informing mobile station 202 of its assigned resources in the uplink direction, is passed from data link layer 254 to RF hardware layer 258 through physical layer 256 for transmission of packet resource assignment message 430 from network 206 to mobile station 202 along the slow dedicated control channel. Mobile station 202 may not send information over the packet domain until packet resource assignment message 430 is received from network 206, after which mobile station 202 may send information on a temporary block flow (TBF), which uses a packet data traffic channel (PDTCH), or on a packet associated control channel. These resources then remain available for a period defined by timers (not shown) and uplink signaling by mobile station 202 to tear down the packet transfer upon completion of the packet data.

Upon receipt of packet resource assignment message 430, a packet control acknowledge message 432, informing network 206 once mobile station 202 has actually received and understands the resource assignment from packet resource assignment message 430, is passed from data link layer 236 to RF hardware layer 240 through physical layer 238 for transmission of packet control acknowledgement message 432 from mobile station 202 to network 206 along the packet data transmit channel.

In this way, by transmitting packet resource request 428 and packet resource assignment message 430 along the slow dedicated control channel, the present invention utilizes the slow dedicated control channel, rather than the packet associated control channel, to request and set up a packet associated control channel for transmission of SIP OK acknowledgement message 434, thereby reducing the amount of time required for acquiring control channels when packet resource request 428, packet resource assignment message 430 and packet control acknowledge message 432 are sent using the packet associated control channel according to known temporary block flow set up procedures.

Once packet control acknowledge message 432 has been sent to network 206, SIP control module 222 passes SIP OK acknowledgement message 434 to data link layer 236 of mobile station 202, and SIP OK acknowledgement message 434 is passed to RF hardware layer 240 through physical layer 238 for transmission of SIP OK acknowledgement message 434 from mobile station 202 to network 206 over the packet associated control channel. RF hardware layer 258 of network 206 passes SIP OK acknowledgement message 434 to radio interface layer 252 through physical layer 256 and data link layer 254. Upstream SIP MUX 262 removes SIP OK acknowledgement message 434 from the call control data and session initiation protocol command stream received from radio interface layer 252, and passes SIP OK acknowledgement message 434 to SIP server 224. SIP server 224 acknowledges receipt of SIP OK acknowledgement message 434 by sending a SIP CONNECT acknowledgement command to downstream SIP MUX 260. Downstream SIP MUX 260 passes the SIP CONNECT acknowledgement command to SIP control module 264, which informs GPRS user data stack 250 of its intent to set up the packet associated control channel in order to send the SIP CONNECT acknowledgement command to mobile station 202.

Figure 9:
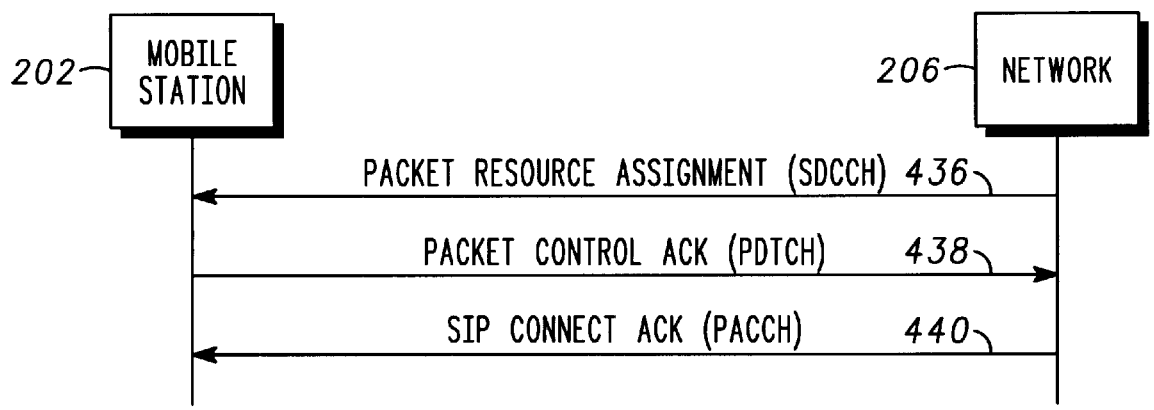

As illustrated in FIG. 9, in order to enable network 206 to send the SIP CONNECT acknowledgement command to mobile station 202, a packet resource assignment message 436, which informs mobile station 202 of its assigned resources in the downlink direction, is passed by data link layer 254 to RF hardware layer 258 through physical layer 256, for transmission of packet resource assignment message 436 along the slow dedicated control channel from network 206 to mobile station 202.

Network 206 must then wait for an acknowledgement of packet resource assignment message 436 from mobile station 202 before downlink information may be sent by network 206 to mobile station 202 on the packet associated control channel or in a temporary block flow.

Packet resource assignment message 436 is received at RF hardware layer 240 of mobile station 202 and passed to GPRS user data stack 232 through physical layer 238 and data link layer 236. A packet control acknowledgement command 438, informing network 206 that mobile station 202 has received and understands the resource assignment and that therefore network 206 may now send a message to mobile station 202, is subsequently passed by data link layer 236 to RF hardware layer 240 through physical layer 238, for transmission of packet control acknowledgement command 438 from mobile station 202 to network 206 along the packet data transmit channel.

Packet control acknowledgement command 438 is received at RF hardware layer 258 of network 206 and passed to GPRS user data stack 250 through physical layer 256 and data link layer 254. Once informed by GPRS user data stack 250 of acknowledgement associated with packet resource assignment message 438 from mobile station 202, i.e., receipt of packet control acknowledgement command 438, SIP control module 264 passes a SIP CONNECT acknowledgement command 440 to data link layer 254, which then passes SIP CONNECT acknowledgement command 440 to RF hardware layer 258 through physical layer 256, for transmission of SIP CONNECT acknowledgement command 440 from network 206 to mobile station 202 along the packet associated control channel.

In this way, by transmitting packet resource assignment message 436 along the slow dedicated control channel, the present invention utilizes the slow dedicated control channel to set up a packet associated control channel for transmission of SIP CONNECT acknowledgement command 440, thereby reducing the amount of time required for acquiring control channels when packet resource assignment message 436 and packet control acknowledgement message 438 are sent using the packet associated control channel according to known temporary block flow set up procedures.

SIP CONNECT acknowledgement command 440 is received by RF hardware layer 240 of mobile station 202 and passed through physical layer 238 to data link layer 236, which passes SIP CONNECT acknowledgement command 440 to SIP control module 246. Once SIP CONNECT acknowledgement command 440 is received by mobile station 202, the session initiation protocol setup is completed.

By utilizing the slow dedicated control channel to request a packet associated control channel for the transmission of session initiation protocol messages, the present invention eliminates much of the set up time required for utilizing the session initiation protocol when a packet associated control channel is used for packet channel set up.

While a particular embodiment of the present invention has been shown and described, modifications may be made. It is therefore intended in the appended claims to cover all such changes and modifications that fall within the true spirit and scope of the invention.

For example, although the method and apparatus of the present invention for the interchange of session initiation protocol signaling messages between mobile station 202 and network 206 for setup of multimedia calls described above relates to a session initiation protocol call that originates at mobile station 202, it is understood that in a session initiation protocol call that originates at network 206, network 206 initially sends a packet paging request on the paging channel to mobile station 202, which responds by sending a paging acknowledgement message to network 206 on paging channel. Once the paging acknowledgement message is sent, the set up and commands are performed according to the present invention, as described above in reference to FIGS. 4–9, beginning with mobile station 202 using the random access channel to transmit channel request access burst 400. Therefore, description of a session initiation protocol call that originates at network 206 has been omitted merely for brevity.

Furthermore, although SIP multiplexer modules 218 and 228 are shown and described as being located within mobile station 202 and network 206, respectively, it is understood that, according to the present invention, SIP multiplexer module 218 could be located within user host 204, rather than mobile station 202, and that SIP multiplexer module 228 could be located within any one or more of users hosts 212, rather than network 206.

What is claimed is:

1. A wireless communication device exchanging session initiation protocol signaling messages with a network, comprising:
    a multiplexer module multiplexing call control data and session initiation protocol commands transmitted between the wireless communication device and the network; and
    a control module, positioned within the multiplexer module, determining whether a packet associated control channel has been set up, wherein, in response to the packet associated control channel not being set up, the multiplexer module utilizes a slow dedicated control channel for transmitting signaling associated with requesting a packet associated control channel for transmitting the session initiation protocol commands.

2. The wireless communication device of claim 1, wherein a user host is linked to the wireless communication device, the user host performing a multimedia call with a remote user host through the wireless communication device and the network.

3. The wireless communication device of claim 1, wherein a user host is positioned within the wireless communication device, the user host performing a multimedia call with a remote user host through the wireless communication device and the network.

4. The wireless communication device of claim 1, wherein, in response to the packet associated control channel being set up, packet data channels are utilized for transmission of a packet resource request and a packet resource assignment message associated with setting up the packet associated control channel.

5. The communication device of claim 1, further comprising:
    a downstream multiplexer multiplexing and passing the session initiation protocol commands to the control module; and
    an upstream multiplexer multiplexing the call control data and the session initiation protocol commands, passing the call control data to the control module, and passing the session initiation protocol commands to a user host.

6. The wireless communication system of claim 5, wherein, in response to the packet associated control channel not being set up, the slow dedicated control channel is utilized for transmission of a packet resource request and/or a packet resource assignment message, the packet resource request and the packet resource assignment message being associated with setting up the packet associated control channel.

7. The wireless communication system of claim 5, wherein, in response to the packet associated control channel not being set up, the slow dedicated control channel is utilized for transmission of a packet resource assignment message associated with setting up the packet associated control channel.

8. A method for setting up a session initiation protocol exchange between a wireless communication device and a network, comprising the steps of:
    determining whether a packet associated control channel has been set up; and
    transmitting, in response to the packet associated control channel not being set up, signaling for setting up the packet associated control channel, to enable transmission of messages associated with setting up the session initiation protocol exchange, wherein the signaling is transmitted along a slow dedicated control channel.

9. The method of claim 8, wherein the signaling includes a packet resource request and a packet resource assignment message.

10. The method of claim 8, wherein the signaling includes a packet resource assignment message.

11. The method of claim 8, further comprising the step of transmitting the signaling, in response to the packet associated control channel being set up, using a packet data channel.

12. The method of claim 8, wherein the step of transmitting further comprises:
    transmitting a first packet resource request and a first packet resource assignment message associated with setting up a first command transmitted between the wireless communication device and the network, the first command indicating the desire to set up the session initiation protocol exchange;

transmitting a second packet resource assignment message associated with setting up a second command transmitted between the wireless communication device and the network, the second command indicating the effectuation of the session initiation protocol exchange;

transmitting a second packet resource request and a third packet resource assignment message associated with setting up a third command transmitted between the wireless communication device and the network, the third command acknowledging the effectuation of the session initiation protocol exchange; and transmitting a fourth packet resource assignment message associated with setting up a fourth command transmitted between the wireless communication device and the network, the fourth command completing the session initiation protocol exchange set up.

13. A communication system for exchanging session initiation protocol signaling messages between a user host associated with a wireless communication device and a remote user host through a network, the communication system comprising:

a first multiplexer module, positioned within the wireless communication device, multiplexing call control data received from the remote user host, and session initiation protocol commands transmitted between the user host and the remote user host;

a second multiplexer module, positioned within the network, multiplexing second call control data received from the user host, and session initiation protocol commands transmitted between the user host and the remote user host;

a server, positioned within the network, routing session initiation protocol commands transmitted to the network through the first multiplexer module, and routing session initiation protocol commands transmitted through the second multiplexer module to the wireless communication device, wherein the first and the second multiplexer modules utilize a slow dedicated control channel for requesting a packet associated control channel for transmission of the session initiation protocol commands.

14. The communication system of claim 13, wherein the first multiplexer module transmits a packet resource request and a packet resource assignment message, associated with setting up the packet associated control channel, along the slow dedicated control channel.

15. The communication system of claim 14, wherein the second multiplexer module transmits a packet resource assignment message, associated with setting up the packet associated control channel, along the slow dedicated control channel.

16. The communication system of claim 13, further comprising:

a first control module, positioned in the first multiplexer module, determining whether a packet associated control channel has been set up in response to receiving a session initiation protocol command from the user host; and a second control module, positioned in the second multiplexer module, wherein, in response to the packet associated control channel not being set up, the first control modules utilizes the slow dedicated control channel for transmission of a packet resource request from the wireless communication device to the network, and wherein the second control module utilizes the slow dedicated control channel for transmission of a packet resource assignment message from the network to the wireless communication device, the packet resource request and the packet resource assignment message being associated with setting up the packet associated control channel.

17. The communication system of claim 16, wherein, in response to the packet associated control channel being set up, packet data channels are utilized for transmission of the packet resource request and the packet resource assignment message.

18. The communication system of claim 17, further comprising:

a first downstream multiplexer, positioned in the first multiplexer module, multiplexing and passing the session initiation protocol command received from the user host to the first control module;

a first upstream multiplexer, position in the first multiplexer module, multiplexing the call control data received from the remote user host and session initiation protocol commands transmitted from the network, and passing the call control data received from the remote user host to the first control module and passing the session initiation protocol commands transmitted from the network to the user host;

a second downstream multiplexer, positioned in the second multiplexer module, multiplexing and passing the session initiation protocol command received from the remote user host to the second control module; and a second upstream multiplexer, position in the second multiplexer module, multiplexing the call control data received from the user host and session initiation protocol commands transmitted from the wireless communication device, and passing the call control data received from the user host to the second control module and passing the session initiation protocol commands transmitted from the wireless communication device to the remote user host.

19. The communication system of claim 18, wherein the user host is separate from and linked to the wireless communication device.

20. The communication system of claim 18, wherein the user host is positioned within the wireless communication device.

21. The communication system of claim 18, wherein the server is positioned outside the network.

22. The communication system of claim 18, wherein the first multiplexer module is positioned within the user host.

23. The communication system of claim 18, wherein the second multiplexer is positioned within the remote user host.

* * * * *